(12) United States Patent
Ren et al.

(10) Patent No.: US 11,368,643 B2
(45) Date of Patent: Jun. 21, 2022

(54) PULSED TIME-OF-FLIGHT SENSOR, PULSED TIME-OF-FLIGHT PIXEL ARRAY AND OPERATION METHOD THEREFOR

(71) Applicant: SUTENG INNOVATION TECHNOLOGY CO., LTD., Shenzhen (CN)

(72) Inventors: Yalin Ren, Sunnyvale, CA (US); Guangbin Zhang, Cupertino, CA (US)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 815 days.

(21) Appl. No.: 16/260,717

(22) Filed: Jan. 29, 2019

(65) Prior Publication Data

US 2019/0235061 A1    Aug. 1, 2019

Related U.S. Application Data

(60) Provisional application No. 62/625,265, filed on Feb. 1, 2018.

(51) Int. Cl.

| | |
|---|---|
| *H04N 5/374* | (2011.01) |
| *H04N 5/3745* | (2011.01) |
| *G01S 7/4863* | (2020.01) |
| *G01S 17/10* | (2020.01) |
| *H04N 5/341* | (2011.01) |
| *H04N 5/353* | (2011.01) |
| *G01S 17/894* | (2020.01) |

(52) U.S. Cl.
CPC ....... *H04N 5/37455* (2013.01); *G01S 7/4863* (2013.01); *G01S 17/10* (2013.01); *G01S 17/894* (2020.01); *H04N 5/341* (2013.01); *H04N 5/353* (2013.01); *H04N 5/3745* (2013.01)

(58) Field of Classification Search
CPC ...... H04N 5/341; H04N 5/353; H04N 5/3745; H04N 5/37455; G01S 7/4863; G01S 17/10; G01S 17/894
See application file for complete search history.

(56) References Cited

U.S. PATENT DOCUMENTS

| | | | |
|---|---|---|---|
| 8,665,454 B2* | 3/2014 | Fowler | G06V 10/147 356/601 |
| 2015/0144790 A1* | 5/2015 | Velichko | H01L 27/14875 250/338.4 |

* cited by examiner

*Primary Examiner* — Kevin K Pyo
(74) *Attorney, Agent, or Firm* — Bayes PLLC (57) ABSTRACT

A pToF sensor, a pToF pixel array and an operation method therefor are provided. The pToF pixel array includes a plurality of pToF pixels distributed in an array, a control circuit, and a conversion circuit. Each of the pToF pixels includes a photo sensitive unit configured to detect a return signal of a light pulse signal, and a first conversion unit configured to convert a time signal corresponding to each of the pToF pixels to an analog signal. The control circuit is connected to each of the pToF pixels, and configured to control an operation mode of each of the pToF pixels. The conversion circuit is connected to each of the pToF pixels, and configured to calculate a time-of-fight corresponding to each of the pToF pixels according to the analog signal corresponding to each of the pToF pixels.

20 Claims, 8 Drawing Sheets

PULSED TIME-OF-FLIGHT SENSOR, PULSED TIME-OF-FLIGHT PIXEL ARRAY AND OPERATION METHOD THEREFOR

CROSS REFERENCE TO RELATED APPLICATION

This application claims the benefit of the provisional application No. 62/625,265, entitled "SCALABLE PULSED TIME-OF-FLIGHT SENSOR", and filed on Feb. 1, 2018, the entire content of which is incorporated herein by reference in its entirety.

TECHNICAL FIELD

The present disclosure relates to the field of the sensor technologies for Light Detection and Ranging (LiDAR), and more particularly relates to a pulsed Time-of-Flight (pToF) sensor, a pulsed Time-of-Flight pixel array and an operation method therefor.

BACKGROUND

LiDAR is more and more demanded than before in recent years for autonomous driving, robots, face ID, 3D modeling and AR/VR (Augmented Reality/Virtual Reality) applications, etc. Particularly for the autonomous driving, a long range operation under strong background sunshine is highly demanded, which requires a high sensitivity and a fast ToF (Time-of-Flight) response. A structure of a pulsed ToF sensor is theoretically preferred because of the following fundamental advantages.

a) Strong but ultra-short laser pulses significantly increase signal-noise-ratio (SNR) during a ToF operation, within the limitation of eye-safe regulations.

b) A pulsed operation mode is better to catch time points more accurately within a single shot, compared with that of a continuous wave (CW) operation mode.

However, regardless of these fundamental advantages, the development of a large scale array of the pToF sensors is somehow lagged behind.

SUMMARY

A pulsed Time-of-Flight (pToF) sensor, a pulsed Time-of-Flight pixel array and an operation method therefor are provided, which are suitable for implementing both small and large scale array integration.

A pToF pixel array is provided according to an aspect of the present disclosure.

The pToF pixel array includes a plurality of pToF pixels distributed in an array, a control circuit, and a conversion circuit. Each of the pToF pixels includes a photo sensitive unit configured to detect a return signal of a light pulse signal, and a first conversion unit provided inside of each of the pToF pixels and configured to convert a time signal corresponding to each of the pToF pixels to an analog signal. The control circuit is provided outside of the pToF pixels, connected to each of the pToF pixels, and configured to control an operation mode of each of the pToF pixels. The conversion circuit is provided outside of the pToF pixels, connected to each of the pToF pixels, and configured to calculate a time-of-fight corresponding to each of the pToF pixels according to the analog signal corresponding to each of the pToF pixels, wherein the time-of-flight is a time from sending out the light pulse signal to receiving the return signal of the light pulse signal by each of the pToF pixels.

A pToF sensor is provided according to another aspect of the present disclosure.

The pToF sensor includes a pToF pixel array. The pToF pixel array includes a plurality of pToF pixels distributed in an array, a control circuit, and a conversion circuit. Each of the pToF pixels includes a photo sensitive unit configured to detect a return signal of a light pulse signal, and a first conversion unit provided inside of each of the pToF pixels and configured to convert a time signal corresponding to each of the pToF pixels to an analog signal. The control circuit is provided outside of the pToF pixels, connected to each of the pToF pixels, and configured to control an operation mode of each of the pToF pixels. The conversion circuit is provided outside of the pToF pixels, connected to each of the pToF pixels, and configured to calculate a time-of-fight corresponding to each of the pToF pixels according to the analog signal corresponding to each of the pToF pixels, wherein the time-of-flight is a time from sending out the light pulse signal to receiving the return signal of the light pulse signal by each of the pToF pixels.

An operation method for a pToF pixel array is provided according to another aspect of the present disclosure.

The pToF pixel array includes a plurality of pToF pixels distributed in an array, and the operation method for a pToF pixel array includes: receiving a pixel address and mode information; when the mode information indicates a first mode, triggering sending out of a light pulse signal, and obtaining a first voltage signal when sending out the light pulse signal simultaneously; storing the first voltage signal when the pToF pixel corresponding to the pixel address receives a return signal of the light pulse signal in a preset time period and a signal value of the return signal is higher than a preset threshold value; obtaining a second voltage signal and a third voltage signal related to the first voltage signal after the pToF pixel corresponding to the pixel address receives the return signal of the light pulse signal in the preset time period and the signal value of the return signal is higher than the preset threshold value; and and calculating a time-of-flight corresponding to the pToF pixel corresponding to the pixel address, wherein the time-of-flight is a time from sending out the light pulse signal to receiving the return signal of the light pulse signal by the pToF pixel.

BRIEF DESCRIPTION OF THE DRAWINGS

To describe the technical solutions of the embodiments of the present disclosure or the prior art more clearly, the following briefly introduces the accompanying drawings required for describing the embodiments or the prior art. Apparently, the accompanying drawings in the following description show some embodiments of the present disclosure, and persons of ordinary skill in the art may also derive other drawings from these accompanying drawings without creative efforts.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
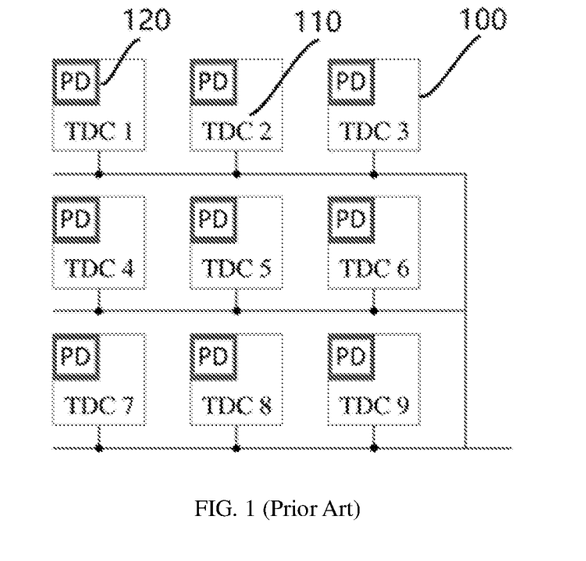
FIG. 1 is a diagram illustrating a structure of a pToF pixel array according to the prior art.

FIG. 1 is a diagram illustrating a structure of a pToF array according to the prior art. In this structure, the pToF array includes a plurality of pToF pixels 100. Each of the pToF pixels 100 includes a photo sensitive device with its direct supporting circuit, referred to as "PD" 120 in FIG. 1, and a Time-to-Digital Converter (TDC) 110 provided inside of the PD 120. Within each of the pToF pixels 100, one TDC 110 corresponds to one PD 120. To accurately catch a waveform of a fast transient response of the PD 120, a very fast TDC 110 beyond gigahertz is normally required. When trying to integrate such pToF pixel structure into a large scale array, several structural issues will occur.

Firstly, due to the added complexity of the fast TDC 110 in the pToF pixel 100, normally a pixel size of the pToF pixel 100 is relatively large with a reduced fill-factor. The fill-factor herein means a ratio of an effective light sensitive area over a total pixel layout area.

Secondly, the added TDCs in the pToF pixel 100 also increase a gap area between the neighbor pToF pixels 100. It is not a big issue in a traditional photography imaging system, but it could be a more serious issue in a LiDAR application. Specifically, some small objects, such as a thin pillar, may not be detected by the LiDAR application because of the relatively large gap area between the neighbor pFoF pixels 100, which could lead to a potential accident.

Thirdly, the fast TDC 110 in the pToF pixel 100 normally consumes a certain amount of power. When a large number of the fast TDCs 110 in the pToF pixel 100 are used for a large scale array, the total power consumption may be significant. The large power consumption not only adds a heavy burden to a system power budget, but also heats up the array locally, thereby causing the drop in performance or even the occurrence of a malfunction at a high temperature.

Last but not least, the fast TDC 100 in the pToF pixel 100 normally requires a high speed clock signal with a minimum jitter and delay. Unfortunately, distributing a multi-gigahertz clock signal into each pToF pixel 100 within a large scale array evenly and quietly is nearly a mission-impossible. As a result, a conversion error introduced by a jitter and delay variation between each pToF pixels 100 will definitely cause a significant drop in performance drop when trying to implement a large scale array.

Figure 2:
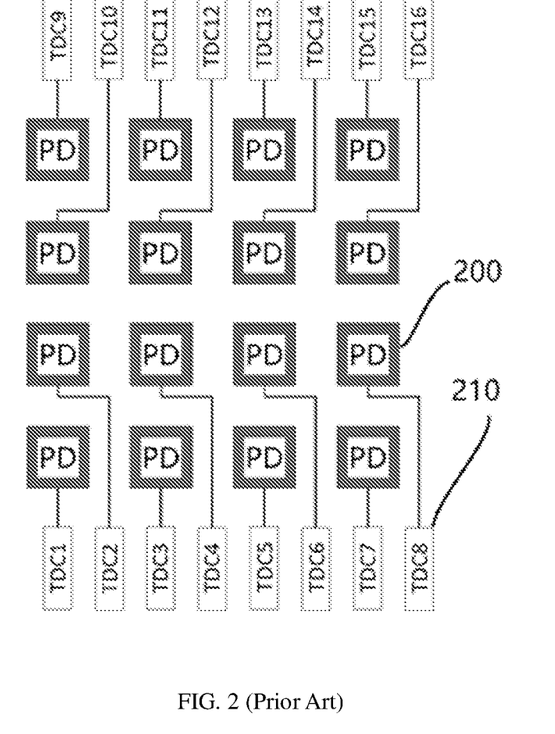
FIG. 2 is a diagram illustrating another structure of a pToF pixel array according to the prior art.

Alternatively, a direct connection from each pToF pixel to the TDC provided outside of the pToF array may be used instead. FIG. 2 is a diagram illustrating another structure of a pToF array according to the prior art. As illustrated in FIG. 2, PDs 200 form a central part of the pToF array. Each PD 200 has a direct routing path to connect to one TDC 210 located outside of the pToF array. In this way, a smaller gap area between neighbor pToF pixels and a large fill-factor may be achieved. However, the following issues still exist.

Firstly, there is no way to route the direct connection for each PD 200 to the TDC 210 provided outside of the pToF array, when the scale of the pToF array is large. In the example illustrated in FIG. 2, it is only a small pToF array of 4×4, but it already used two-side TDC floorplan, and in each side, all gap areas are occupied with routing lines.

Secondly, since the principle of one PD corresponding to one TDC still exists, the amount of TDCs is still large if the scale of the pToF array is large. As a result, the total power consumption is still as large as that of the pToF array with the TDCs provided inside of the pToF pixel 100 illustrated in FIG. 1.

Thirdly, a large count of TDCs also means a large area, which leads to a larger chip cost.

At the same time, a high speed clock signal distribution over a large area still remains an issue, with introducing a significant amount of measurement errors.

Figure 3:
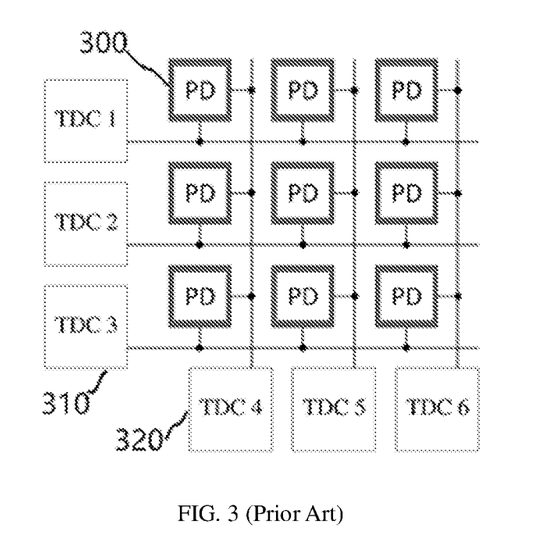
FIG. 3 is a diagram illustrating another structure of a pToF pixel array according to the prior art.

FIG. 3 is a diagram illustrating another structure of a pToF array according to the prior art. In this structure, each TDC 310 or 320 is shared by one row of the pToF pixels 300, or one column of the pToF pixels 300, or both. In this way, the amount of the TDCs may be significantly reduced from a level of M*N to a level of M+N, where M and N represents a number of rows and a number of columns of the pToF array respectively. As a result, a relatively larger scale pToF array may be realized than the two prior arts discussed above. However, there are still some basic limitations.

Firstly, it can only detect a firing pulse of one row, or one column, or one pToF pixel 300 at a time, depending on an operation method for the pToF array with shared TDCs. When multiple pToF pixels 300 fire at the same or close enough time period, the shared TDCs 310 or 320 may only response to some firing pulses of the pToF pixels 300 and ignore others. In many cases, the ignored firing pulses are actually real important signals which need immediate attentions.

Secondly, a large circuit loading and a parasitic RC component on the column or row line strongly limit a response speed of the TDC. Particularly, when a large scale pToF array is implemented, each shared column/row lines may have hundreds or even thousands of pToF pixels connecting to it, which act as RC loadings on a fast pulse readout path. The pulses to be readout are significantly slowed down by these RC loadings and related parasitic RC components, and at the same time unwanted clock jitters, power noises and signal coupling noises are introduced.

As a brief conclusion, the above prior arts cannot implement a large scale pToF array with good performance.

Figure 4:
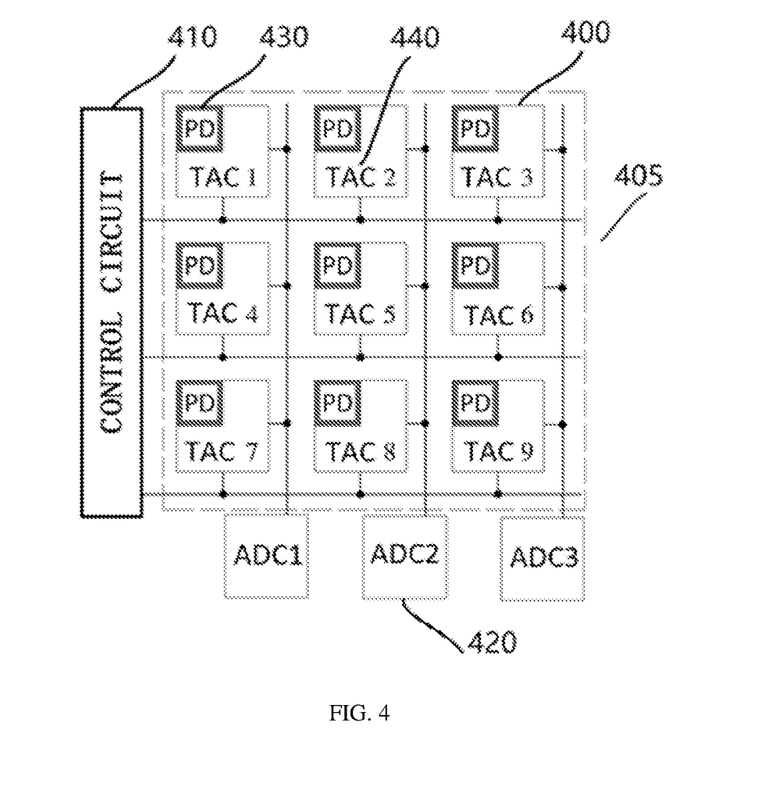
FIG. 4 is a diagram illustrating a structure of a pToF pixel array according to an embodiment of the present disclosure.

FIG. 4 is a diagram illustrating a structure of a pToF pixel array according to an embodiment of the present disclosure. As shown in FIG. 4, the pToF pixel array 405 includes a plurality of pToF pixels 400 distributed in an array, a control circuit 410, and a conversion circuit 420.

Each of the pToF pixels 400 includes a photo sensitive unit 430 configured to detect a return signal of a light pulse signal and a first conversion unit 440 provided inside of each of the pToF pixels and configured to convert a time signal corresponding to each of the pToF pixels to an analog signal.

The photo sensitive unit 430 may be a photo sensitive device with its direct supporting bias circuit, marked as PD unit 430 in FIG. 4. The first conversion unit 440 may be a time-to-analog conversion circuit, marked as TAC unit 440 in FIG. 4. The conversion circuit 420 may be an analog-to-digital conversion circuit, marked as ADC unit 420 in FIG. 4.

The control circuit is provided outside of the pToF pixels, connected to each of the pToF pixels, and configured to control an operation mode of each of the pToF pixels. The conversion circuit is provided outside of the pToF pixels, connected to each of the pToF pixels, and configured to calculate a time-of-flight corresponding to each of the pToF pixels according to the analog signal corresponding to each of the pToF pixels. The time-of-flight is a time from sending out the light pulse signal to receiving the return signal of the light pulse signal by each of the pToF pixels.

In some embodiments, the pToF pixel array 405 may include one conversion circuit 420 connected to all pToF pixels 400. In other embodiments, the pToF pixel array 405 may include a plurality of conversion circuits 420, each of which is connected to one column/row of the pToF pixels 400, or to several columns/rows of the pToF pixels 400. FIG. 4 shows an example that each of the conversion circuits 420 is connected to one column of the pToF pixels 400.

In the embodiment, a time-to-digital conversion to calculate a time-of-flight is not fully completed in a pToF pixel, or outside of a pToF pixel. Instead, the time-to-digital conversion is split into two parts, including a time-to-analog conversion in a pToF pixel, and an analog-to-digital conversion outside the pToF pixel.

In the pToF pixel array according to the embodiment, there is no need to distribute a high speed clock signal for each pToF pixel or provide a parasitic RC component, so that a smaller gap area between the neighbor pToF pixels and a higher fill-factor may be obtained. Without the high speed clock signal or the parasitic RC component, the first conversion unit (TAC unit) 440 in the pToF pixel may be realized with a much smaller layout area, which is beneficial to get a smaller gap area between the neighbor pToF pixels and is good for LiDAR applications.

Furthermore, the total layout area and power consumption of the pToF pixel array may be reduced. With no need of the distribution of the high speed clock signal and the RC components, the first conversion unit 440 in the pToF pixel may be much more power efficient than the TDC in the pToF pixel. Additionally, the conversion circuit (ADC unit) 420 may be shared by one column or one row of the pToF pixels 400, thus the amount of the conversion circuits may be acceptable in similar designs widely used in the traditional photography CIS (CMOS Image Sensor) industry, particularly in the mobile phone camera industry. As a result, the total layout area and the power consumption is significantly reduced compared with most other structures trying to implement the large scale pToF pixel array.

Moreover, the pToF pixel array 405 according to the embodiment of the present disclosure is mostly suitable for scalable integration. With no need of distributing the high speed clock signal for each pToF pixel, it is possible to implement a large scale pToF pixel array with a mega-pixel level as demanded by the applications.

The structure of the pToF pixel array according to the embodiment of the present disclosure introduces more flexibility in an operation mode. The first conversion unit 440 in the pToF pixel 400 may also function as a temporary storage node, which adds capability of decoupling the photon capture timing and the readout timing. The structure of the pToF pixel array may be compatible with a global shutter mode, a line scan mode, as well as a pixel scan mode, which will be described in more detail below.

Figure 5:
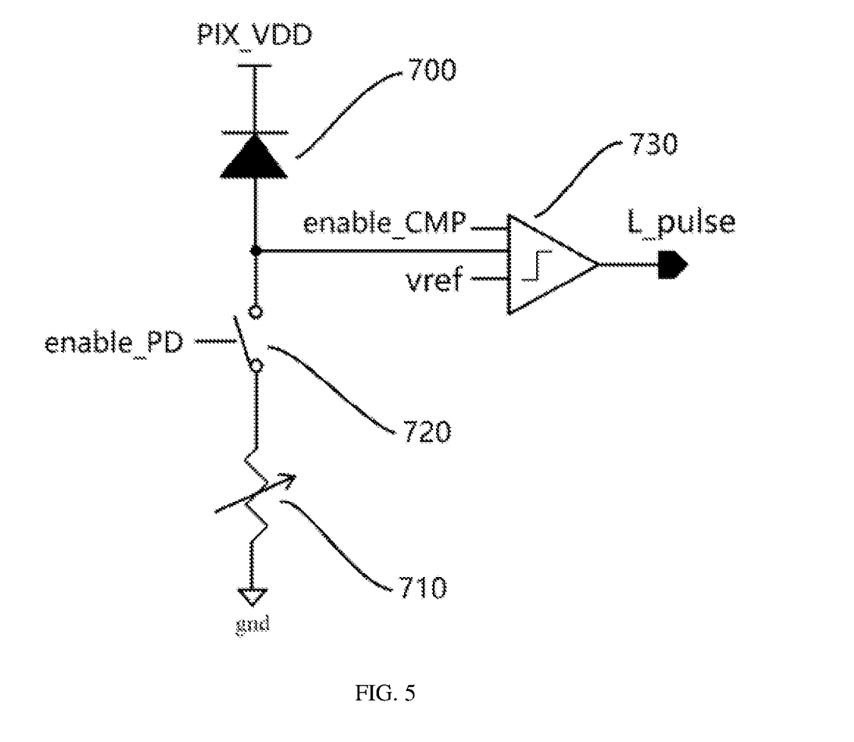
FIG. 5 is a circuit diagram of a photo sensitive unit according to an embodiment of the present disclosure.

FIG. 5 is a circuit diagram of a photo sensitive unit according to an embodiment of the present disclosure. As shown in FIG. 5, the photo sensitive unit 430 may include a photodiode 700, an adjustable quenching resistor 710, an enable switch 720, and a comparator 730.

In the embodiment, one end of the photodiode 700 is connected to a first power supply 'PIX_VDD', and the other end of the photodiode 700 is connected to the adjustable quenching resistor 710 via the enable switch 720 and to a first input end (an analog input end) of the comparator 730. A control end of the enable switch 720 is connected to the control circuit 410. A second input end (another analog input end) of the comparator 730 is connected to a reference voltage 'vref', a third input end (an enable input end) of the comparator 730 is connected to the control circuit 410, and an output end of the comparator 730 is connected to the first conversion unit 440. The reference voltage 'vref' may be functioned as a threshold voltage. The third input end is configured to control the comparator 730 to be functional or to stay in an idle state.

The first power supply 'PIX_VDD' may be a high voltage and the photodiode 700 may be reversed biased by the high voltage. A connection point of the photodiode, the first input end of the comparator and the enable switch is referred to as a first node 'SN' (sense node). The first node is a P type node of the photodiode 700.

The photodiode may be any one of a simple P-I-N photodiode, an Avalanche Photodiode (APD), a Silicon Photomultiplier (SiPM), a Single Photon Avalanche Photodiode (SPAP), or any possible photodiode which can absorb incident photons and convert the incident photons into electrons.

In some embodiments, when the enable switch 720 is enabled, a group of photons are detected by the photodiode 700 within a short period of time, and electrons are generated by the photodiode 700, resulting in current passing through the photodiode 700 and increase of the adjustable quenching resistor 710. Accordingly, the voltage at the first node 'SN' will rise rapidly. When the voltage at the first node 'SN' is higher than the reference voltage 'vref', the comparator 730 will output a "high" for an output signal 'L_pulse' to trigger the first conversion unit 440, which will be described below. After the voltage at the first node 'SN' rises to a certain amplitude, quenching will happen and the voltage at the first node 'SN' starts to drop gradually until the next time to fire another pulse.

Figure 6:
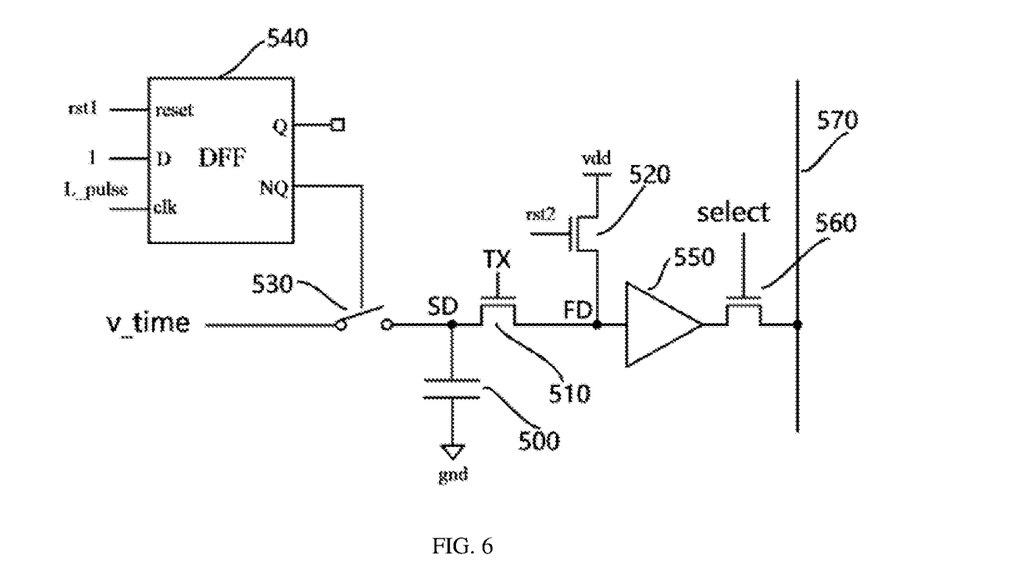
FIG. 6 is a circuit diagram of a first conversion unit according to an embodiment of the present disclosure.

FIG. 6 is a circuit diagram of a first conversion unit according to an embodiment of the present disclosure. As shown in FIG. 6, the first conversion unit 440 may include a logic circuit 540, a sample switch 530, a capacitor 500, a first MOS 510, a second MOS 520, a first buffer 550, a selective switch 560, and an output bitline 570.

In the embodiment, a first input end of the logic circuit 540 is connected to the control circuit 410, a second input end of the logic circuit 540 is connected to the output end of the comparator 730, and an output end of the logic circuit 540 is connected to a control end of the sample switch 530. A first end of the sample switch 530 is introduced to a first time signal 'v_time', and a second end of the sample switch 530 is grounded via the capacitor 500. A first end of the first MOS 510 is connected to the control circuit 410, a second end of the first MOS 510 is grounded via the capacitor 500, and a third end of the first MOS 510 is connected to an input end of the first buffer 550. A first end of the second MOS 520 is connected to the control circuit 410, a second end of the second MOS 520 is connected a second power supply 'vdd', and a third end of the second MOS 520 is connected to the input end of the first buffer 550. A first end of the selective switch 560 is connected to an output end of the first buffer 550, a second end of the selective switch 560 is connected to the output bitline 570, and a control end of the selective switch 560 is connected to the control circuit 410. The output bitline 570 is connected to the conversion circuit 420.

In some embodiments, the logic circuit 540 may be implemented as a simple DFF (D-Flip-Flop) circuit. The first input end of the logic circuit 540 may receive a reset signal 'rst 1', and the second input end of the logic circuit 540 may receive a trigger signal 'L_pulse' received from the comparator 730. The output end of the logic circuit 540 may be a node NQ for controlling the on/off states of the sample switch 530.

A connection point of the sample switch 530, the capacitor 500 and the first MOS 510 is referred to as a second node 'SD' (storage node). A connection point of the first MOS 510, the second MOS 520 and the first buffer 550 is referred to as a third node 'FD' (floating node). The capacitor 500 is a key component to store a captured time-to analog voltage onto the second node 'SD'.

The first MOS 510 connects the second node 'SD' to the third node 'FD' and reads out the third node 'FD'. Thus, the first MOS 510 may function as a transfer MOS. The second MOS 520 connects the third node 'FD' to the second power supply 'vdd'. Thus, the second MOS 520 may function as a reset MOS. The third node 'FD' is connected to the first buffer 550 for readout. The first buffer 550 may be an unity gain buffer. The components of the first MOS 510, the second MOS 520, the first buffer 550, the selective switch 560 and the output bitline 570 actually form a CIS (CMOS Image Sensor) pixel structure.

Figure 7:
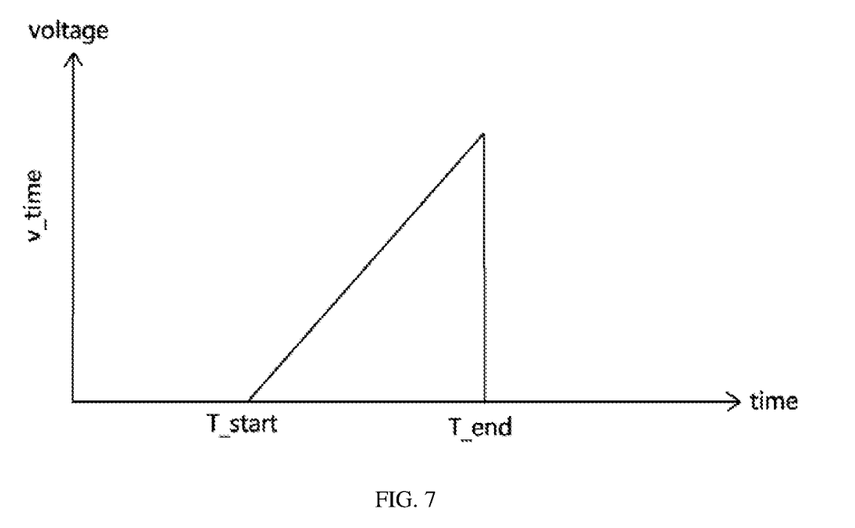
FIG. 7 is a diagram illustrating an example of a first time signal according to an embodiment of the present disclosure.

FIG. 7 is a diagram illustrating an example of a first time signal according to an embodiment of the present disclosure. The first time signal 'v_time' is a voltage waveform representation of the time. In some embodiments, the first time signal 'v_time' may be implemented as shown in FIG. 7. As shown in FIG. 7, the first time signal 'v_time' may be a voltage waveform with repeated voltage ramps rising from a first time point 'T_start', increasing linearly by a certain slope, and resetting back to its origin at a second time point 'T_end'. The voltage ramp may be repeated many times as required by the operation of the pToF pixel array.

In some embodiments, in an operation period, firstly, the first input end of the logic circuit 540 receives a reset signal 'rst 1' to reset the state of the sample switch 530 to on, thus the voltage at the second node 'SD' tracks the voltage of the first time signal 'v_time'. At a certain time point when the photodiode 700 of the photo sensitive unit 430 detects enough photons and thereby the comparator 730 outputs a spike voltage wave as signal 'L_pulse', the logic circuit 540 then changes the state of the sample switch 530 to off, so as to hold a time-related voltage on the second node 'SD' until it is read out by following circuits.

The above description describes the embodiments of the pToF pixel. The pToF pixel may be integrated to a pToF pixel array for better functionality. The control circuit 410 and the conversion circuit 420 are used in the pToF pixel array as illustrated in FIG. 4.

Figure 8:
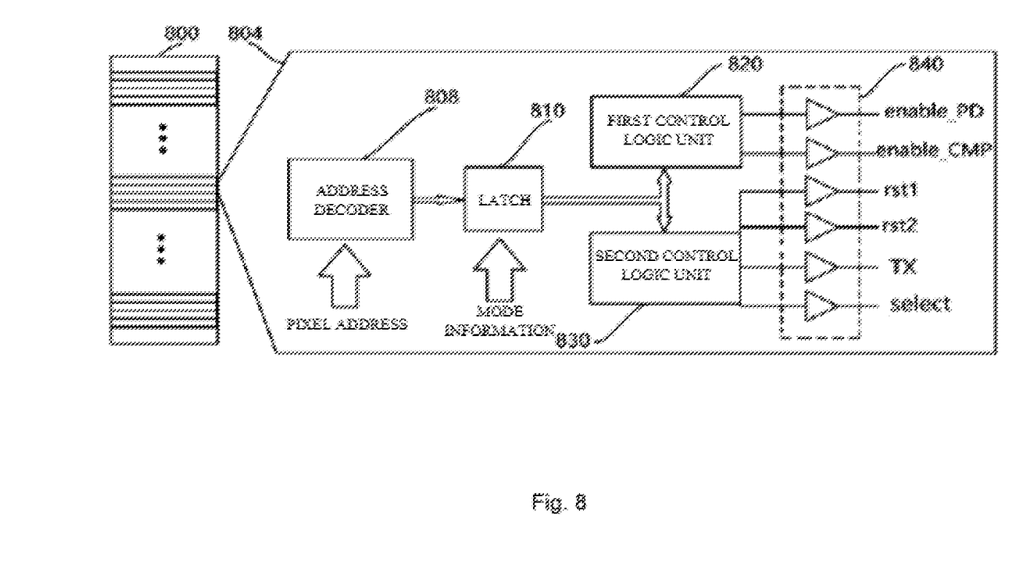
FIG. 8 is a diagram illustrating a structure of a control circuit according to an embodiment of the present disclosure.

FIG. 8 is a diagram illustrating a structure of a control circuit according to an embodiment of the present disclosure. The control circuit 800 may include a plurality of control units. In some embodiments, each of the control units is configured to be connected to a row of the pToF pixels. In FIG. 8, the control unit 804 illustrates an enlarged structure of one of the control units.

The control unit 804 may include: an address decoder 808 configured to receive a pixel address; an latch 810 configured to receive mode information about an operation mode of the pToF pixels 400; a first control logic unit 820 configured to control the photo sensitive unit 430 of the pToF pixel 400 corresponding to the pixel address, according to the pixel address and the operation mode; and a second control logic unit 830 configured to control the first conversion unit 440 of the pToF pixel 400 corresponding to the pixel address, according to the pixel address and the operation mode.

In the embodiment, an input end of the latch 810 is connected to the address decoder 808, and an output end of the latch 810 is connected the first control logic unit 820 and the second control logic unit 830 respectively. Output ends of the first control logic unit 820 are connected to the control end of the enable switch 720 and the third input end of the comparator 730 in the photo sensitive unit 430 respectively. Output ends of the second control logic unit 830 are connected to the first input end of the logic circuit 540, the first end of the first MOS 510, the first end of the second MOS 520 and the control end of the selective switch 560 respectively.

The pixel address may be a row address or an address of one or more pToF pixels in code. Accordingly, the control circuit may scan the pToF pixels line-by-line, one-by-one or globally. When the address decoder 808 receives a row address as an input signal, the control unit 804 enables to select or not select a certain row of pToF pixels. When selected, the latch 810 is enabled and mode information may be received and stored into the latch 810. The mode information may be a code having multi-bits, which represents different functional mode of the pToF pixel.

The output of the latch 810 controls the first control logic unit 820 and the second control logic unit 830 to drive the photo sensitive unit 430 and the first conversion unit 440.

The first control logic unit 820 is a PD control logic unit. The first control logic unit 820 may output a control signal 'enable_PD' to the enable switch 720 and output a control signal 'enable_CMP' to the third input end of the comparator 730 in the photo sensitive unit 430.

The second control logic unit 830 is a readout control logic unit. The second control logic unit 830 may output the control signal 'rst1' to the first input end of the logic circuit 540, output a control signal 'rst2' to the first end of the second MOS 520, output a control signal 'TX' to the first end of the first MOS 510, and output a control signal 'select' to the control end of the selective switch 560.

When all control signal lines in one row are shared lines and connects to all pToF pixels in this row, the RC loading is relatively large. Thus, the control unit 804 may further include a plurality of second buffers 840 connected to the output ends of the first control logic unit 820 and the second control logic unit 830, so as to enhance the driving ability of the first control logic unit 820 and the second control logic unit 830. It is noted that, in some embodiments, the structure of each control unit is identical but with different connections of the pixel address.

In some embodiments, each of the control units 804 is configured to receive the pixel address and the mode information; and when the mode information indicates a first mode, to control the operation mode of the pToF pixel 400 corresponding to the pixel address to the first mode by the first control logic unit 820 and the second control logic unit 830, and to trigger the sending out of the light pulse signal simultaneously.

When the pToF pixel 400 operates in the first mode, the pToF pixel 400 is configured to control the sample switch 530 to be turned on; to obtain a first voltage signal corresponding to the first time signal at the second node; when the photodiode receives the return signal of the light pulse signal in a preset time period, and a voltage of the photodiode 700 at the first node is higher than the reference voltage of the comparator 730, to control the sample switch 530 to be turned off by the logic circuit 540; and to maintain the first voltage signal at the second node.

Specifically, for example, by setting the pixel address and the mode information at the same time, when the mode information received by the latch 810 indicates the first mode, an external illumination module may be triggered to send out a laser or LED pulse signal, and the pToF pixel 400 corresponding to the pixel address is simultaneously enabled into the first mode, which is referred to as a 'capture mode'.

In the first mode, the first control logic unit 820 outputs the control signals 'enable_PD' and 'enable_CMP' to enable the photodiode 700 and the comparator 730. Additionally, there may be a short delay between the control signal 'enable_PD' and control signal 'enable_CMP' to allow smooth circuit response.

In the first mode, the first input end of the logic circuit 540 is reset by the control signal 'rst1', thus the state of the sample switch 530 is reset to on, and the voltage at the second node 'SD' tracks the voltage of the first time signal 'v_time'. Therefore, the first voltage signal corresponding to the first time signal at the second node 'SD' is obtained. The photo sensitive unit 430 and the first conversion unit 440 are prepared. Then the pToF pixel 400 is waiting until the return signal of the light pulse signal being detected.

When the return signal is detected in a preset time period by the photodiode 700 and the voltage at the first node 'SN' is higher than the reference voltage 'vref', the comparator 730 generates a spike 'L_pulse'. The 'L_pulse' triggers the logic circuit 540 to change the state of the sample switch 530 to off, so as to hold a first voltage signal corresponding to the first time signal at the second node 'SD'. There should be a limiting timer to limit the maximum waiting time, i.e., the preset time period, which also defines the maximum distance that the pToF pixel array can measure.

In some embodiments, each of the control units is configured to control the operation mode of the pToF pixel 400 corresponding to the pixel address to a second mode by the second control logic unit 830, after the photo sensitive unit 430 of the pToF pixel 400 receives the return signal of the light pulse signal in the preset time period, and the voltage of the photodiode 700 at the first node is higher than the reference voltage of the comparator 730.

When the pToF pixel 400 operates in the second mode, the pToF pixel 400 is configured to control the selective switch 560 and the second MOS 520 to be turned on; to obtain a second voltage signal at the third node 'FD', and to transmit the second voltage signal to the conversion circuit 420 corresponding to the pToF pixel 400; to control the first MOS to be turned on; and to obtain a third voltage signal at the third node and to transmit the third voltage signal to the conversion circuit 420 corresponding to the pToF pixel 400.

Specifically, for example, after the state of the sample switch 530 is changed to off, the pToF pixel corresponding to the pixel address is control to the second mode. Additionally, it also may be done by input related pixel address and mode information to the control unit 804. In the second mode, firstly, the selective switch 560 is enabled by the control signal 'select' received from the second control logic unit 830, and the second buffer is connected to the outline 570 via the selective switch 560. Then, the second MOS 520 is controlled to be turned on by the control signal 'rst2' to reset the third node 'FD'. After that, the second voltage signal at the third node 'FD' is obtained and transmitted to the conversion circuit 420 corresponding to the pToF pixel 400 through the output bitline 570. The second voltage signal may be expressed as data1=reset FD voltage. Then the first MOS 510 is controlled to be turned on by the control signal 'TX' to transfer the charges at the second node 'SD' to the third node 'FD'. After the transfer, the third voltage signal at the third node 'FD' is obtained and transmitted to the conversion circuit 420 corresponding to the pToF pixel 400 through the output bitline 570. The third voltage signal may be expressed as data2=FD voltage.

In some embodiments, the control signals 'rst1', 'rst2' and 'TX' may be pulse signals.

In some embodiments, the conversion circuit 420 is configured to calculate the time-of-flight corresponding to the pToF pixel 400 according to the received second voltage signal and the third voltage signal.

Specifically, for example, a CDS (Correlated Double Sampling) operation may be done to get the result as data (time-of-flight)=data2−data1.

The process to obtain the time-of-flight may be repeated line-by-line, one-by-one or globally to obtain the time-of-flight corresponding to each of the pToF pixels in the pToF pixel array.

In some embodiments, the control circuit 800 is configured to receive a pixel address and mode information; and when the mode information indicates a first mode, to control the operation mode of the pToF pixel 400 corresponding to the pixel address to a first mode, and to trigger the sending out of the light pulse signal simultaneously.

When the pToF pixel 400 operates in the first mode, the pToF pixel 400 is configured to obtain a first voltage signal when the light pulse signal is sent out; and when receiving the return signal of the light pulse signal in a preset time period and a signal value of the return signal is higher than a preset threshold value, to store the first voltage signal.

In some embodiments, the control circuit is configured to control the operation mode of the pToF pixel corresponding to the pixel address to a second mode, after the pToF pixel receives the return signal of the light pulse signal in the preset time period and the signal value of the return signal is higher than the preset threshold value.

When the pToF pixel operates in the second mode, the pToF pixel is configured to obtain a second voltage signal and a third voltage signal related to the first voltage signal respectively; and to transmit the second voltage signal and the third voltage signal to the conversion circuit corresponding to the pToF pixel.

Furthermore, the conversion circuit 420 is configured to calculate the time-of-flight corresponding to the pToF pixel 400 according to the received second voltage signal and the third voltage signal.

A pToF sensor is provided according to an embodiment of the present disclosure. The pToF sensor may include the pToF pixel array according to any embodiments described above, and details are not described herein again.

Figure 9:
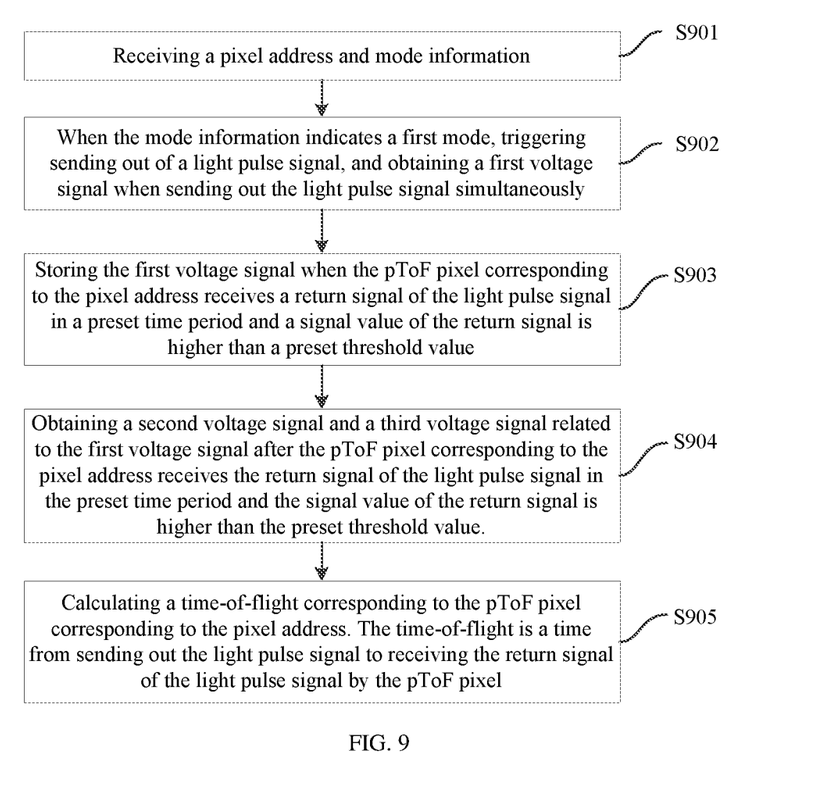
FIG. 9 is a flow chart illustrating an operation method for a pToF pixel array according to an embodiment of the present disclosure.

An operation method for a pToF pixel array is further provided according to an embodiment of the present disclosure. FIG. 9 is a flow chart illustrating an operation method for a pToF pixel array according to an embodiment of the present disclosure.

An operation method for a pToF pixel array is suitable for the pToF pixel array according to any embodiments described above. The operation method includes the following steps.

Step 901, receiving a pixel address and mode information.

Figure 10:
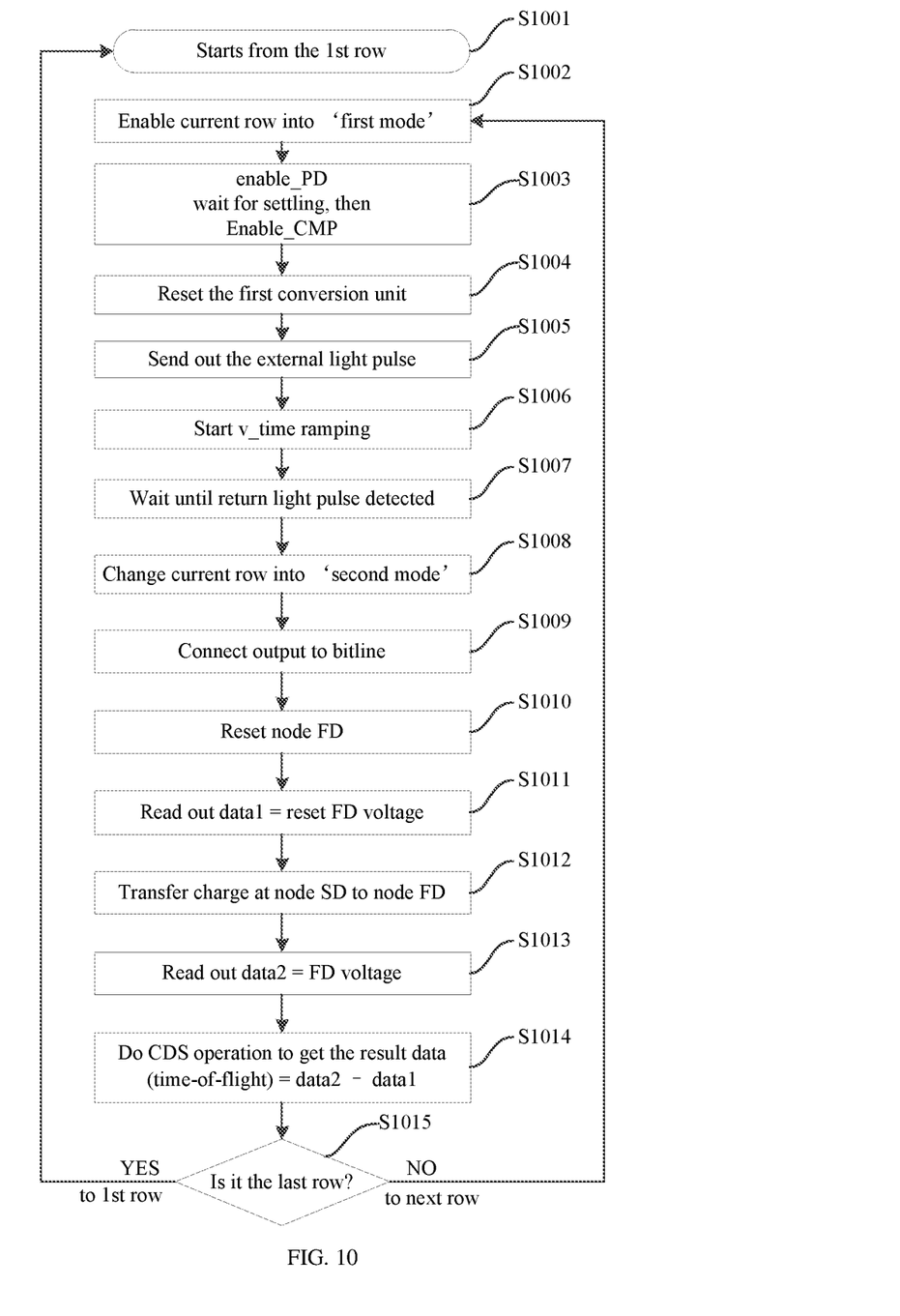
FIG. 10 is a flow chart illustrating an operation method for a pToF pixel array according to another embodiment of the present disclosure.

For example, referring to FIG. 10, the address decoder 808 receives the pixel address indicating the first row and the latch 810 receives the mode information indicating a first mode, thus the operation method starts from the first row which is referred as to a current row (S1001).

Step 902, when the mode information indicates a first mode, triggering sending out of a light pulse signal, and obtaining a first voltage signal when sending out the light pulse signal simultaneously.

For example, referring to FIG. 10, when the latch 810 receives the mode information indicating the first mode, the first control logic unit 820 and the second control logic unit 830 output control signals to drive the photo sensitive unit 430 and the first conversion unit 440 in the first row (the current row) of the pToF pixels, so as to enable the first row (the current row) of the pToF pixels into the first mode (capture mode) (S1002).

Specifically, the first control logic unit 820 may output a control signal 'enable_PD' to the enable switch 720, and output a control signal 'enable_CMP' to the third input end of the comparator 730, so that the enable switch 720 is turned on and the comparator 730 is functioned (S1003). Additionally, there may be a short delay between the control signal 'enable_PD' and control signal 'enable_CMP' to allow smooth circuit response.

At the same time, the first conversion unit 440 is reset (S1004) and the external light pulse signal is triggered to be sent out (S1005). Specifically, the logic circuit 540 receives the control signal 'rst1' from the second control logic unit 830, and thus the state of the sample switch 530 is reset to on. Then the sample switch 530 introduces the first time signal 'v_time' and the voltage the second node 'SD' tracks the voltage of the first time signal 'v_time' (S1006).

Step 903, storing the first voltage signal when the pToF pixel corresponding to the pixel address receives a return signal of the light pulse signal in a preset time period and a signal value of the return signal is higher than a preset threshold value.

For example, referring to FIG. 10, the photodiodes 700 in the first row of the pToF pixels 400 are waiting until the return signal of the light pulse signal being detected in a preset time period (S1007). When the voltage at the first node 'SN' is higher than the reference voltage 'vref' of the comparator 730, the comparator 730 outputs the signal 'L_pulse'. The signal 'L_pulse' triggers the logic circuit 540 to change the state of the sample switch 530 to off, so as to hold a first voltage signal corresponding to the first time signal at the second node 'SD'.

Step 904, obtaining a second voltage signal and a third voltage signal related to the first voltage signal after the pToF pixel corresponding to the pixel address receives the return signal of the light pulse signal in the preset time period and the signal value of the return signal is higher than the preset threshold value.

For example, referring to FIG. 10, the second control logic unit 830 outputs control signals to drive the first conversion unit 440 in the first row of the pToF pixels, so as to enable the first row of the pToF pixels into the second mode (readout mode) (S1008).

Specifically, the selective switch 560 is turned on by the received control signals 'select' form the second control logic unit 830, thus the output end of the second buffer 550 is connected to the output bitline 570 (S1009). The second MOS 520 is turned on by the received control signal 'rst2' form the second control logic unit 830, thus the third node 'FD' is reset (S1010). The second voltage signal at the third node 'FD' is read out as data1=reset FD voltage (S1011) and transmitted to the conversion circuit corresponding to the first row of the pToF pixels 400. Then the first MOS 510 is turned on by the received control signal 'TX' from the second control logic unit 830, and the charges at the second node 'SD' is transferred to the third node 'FD' (S1012). After the transfer, the third voltage signal at the third node 'FD' is read out as data2=FD voltage (S1013) and transmitted to the conversion circuit corresponding to the first row of the pToF pixels 400.

Step 905, calculating a time-of-flight corresponding to the pToF pixel corresponding to the pixel address. The time-of-flight is a time from sending out the light pulse signal to receiving the return signal of the light pulse signal by the pToF pixel.

For example, referring to FIG. 10, the conversion circuit 420 corresponding to the first row of the pToF pixels 400 calculates the time-of-flight corresponding to the first row of the pToF pixels 400 according to the first voltage signal 'data1' and the second voltage signal 'data2'. Specifically, the conversion circuit 420 gets the result as data (time-of-flight)=data2−data1 by a CDS operation (S1014).

After that, the control circuit may determine whether the row of the pToF pixels 400 is the low of the pToF pixel array (S1015), if yes, the operation returns to the step S1001, and if no, the operation proceeds to the next row of the pToF pixels and repeats the steps S1002 to S1015.

In some embodiments, the pToF pixels distributed in the array may be scanned line-by-line, one-by-one or globally, to calculate the time-of-flight corresponding to each of the pToF pixels. For example, the pixel address may be a row address, that is, a row of pixels are selected and the time-of-flights corresponding to the row of pixels are calculated. In particular, the operation method may start from the first row of the pToF pixel array, and perform the calculation line-by-line.

The above description in detail focuses on the embodiments of the present disclosure. Several obvious variations may be applied for performance improvement or to make it adapt to different application demands. For example, FIG. 4 illustrates that a conversion circuit 420 in column level is used using column ADC to do the last stage of the analog-to-digital conversion. Alternatively, it is also possible to just use a sample and hold circuit in column level, and transfer the sampled voltages to one or several conversion circuit in global level to do the analog-to-digital conversion. Furthermore, even the conversion circuit in column level is used, it can be one conversion circuit per column, as illustrated in FIG. 4, and it can also be one conversion circuit shared by several columns to get better cost effective layout area.

For another example, FIG. 6 illustrates a simple example of the first time signal v_time. Alternatively, it can be more complex. For example, it can be a non-linear mapping curve instead of a linear curve. It may also be a signal array instead of one signal, i.e., V_time[0] and V_time[1]. A combination of two or more v_time signal in which one has a fast slope and the other has a slow slop may help cover more dynamic range of the time, thereby helping to measure both the long and short distances at the same time.

A further example is about the comparator 730 used in the photo sensitive unit 430. In the description above, a simple comparator is used without any additional limitations. Alternatively, one can add necessary auto-zero circuit, hysteresis circuit, etc., to improve its performance as well as its robusticity. Additionally, the above described operation method illustrates a typical way to run the embodiment in rolling-shutter, line-scan mode, it is not hard to make some small changes, so that it can also run in frame global shutter mode, or one-by-one pixel scan mode. Finally, single light pulse operation is described as an embodiment of the pToF method, it is also possible to do multi-pulses for better performance and advanced functions.

The present disclosure has been described in terms of particular embodiments and applications, in both summarized and detailed forms, it is not intended that these descriptions in any way limit the scope of the present disclosure to any such embodiments and applications. It will be understood that many substitutions, changes and variations in the described embodiments, applications and details of the present disclosure illustrated herein can be made by those skilled in the art without departing from the spirit of the present disclosure. Therefore, the protection scope of the present disclosure shall be subject to the appended claims.

What is claimed is:

1. A pToF pixel array, comprising:
   a plurality of pToF pixels distributed in an array;
     each of the pToF pixels comprising:
       a photo sensitive unit configured to detect a return signal of a light pulse signal, and
       a first conversion unit provided inside of each of the pToF pixels and configured to convert a time signal corresponding to each of the pToF pixels to an analog signal;
   a control circuit provided outside of the pToF pixels, connected to each of the pToF pixels, and configured to control an operation mode of each of the pToF pixels; and
   a conversion circuit provided outside of the pToF pixels, connected to each of the pToF pixels, and configured to calculate a time-of-fight corresponding to each of the pToF pixels according to the analog signal corresponding to each of the pToF pixels, wherein the time-of-flight is a time from sending out the light pulse signal to receiving the return signal of the light pulse signal by each of the pToF pixels.

2. The pToF pixel array according to claim 1, wherein the photo sensitive unit includes a photodiode, an adjustable quenching resistor, an enable switch, and a comparator; one end of the photodiode is connected to a first power supply, and the other end of the photodiode is connected to the adjustable quenching resistor via the enable switch and to a first input end of the comparator; a control end of the enable switch is connected to the control circuit; and a second input end of the comparator is connected to a reference voltage, a third input end of the comparator is connected to the control circuit, and an output end of the comparator is connected to the first conversion unit.

3. The pToF pixel array according to claim 2, wherein the photodiode is any one of P-I-N photodiode, an Avalanche Photodiode, a Silicon Photomultiplier, and a Single Photon Avalanche Photodiode.

4. The pToF pixel array according to claim 2, wherein the first conversion unit includes a logic circuit, a sample switch, a capacitor, a first MOS, a second MOS, a first buffer, a selective switch, and an output bitline; a first input end of the logic circuit is connected to the control circuit, a second input end of the logic circuit is connected to the output end of the comparator, and an output end of the logic circuit is connected to a control end of the sample switch; a first end of the sample switch is introduced to a first time signal, and a second end of the sample switch is grounded via the capacitor; a first end of the first MOS is connected to the control circuit, a second end of the first MOS is grounded via the capacitor, and a third end of the first MOS is connected to an input end of the first buffer; a first end of the second MOS is connected to the control circuit, a second end of the second MOS is connected a second power supply, and a third end of the second MOS is connected to the input end of the first buffer; a first end of the selective switch is connected to an output end of the first buffer, a second end of the selective switch is connected to the output bitline, and a control end of the selective switch is connected to the control circuit; and the output bitline is connected to the conversion circuit.

5. The pToF pixel array according to claim 4, wherein the first time signal is a voltage waveform with repeated voltage ramps rising from a first time point, increasing linearly by a certain slope, and resetting back at a second time point.

6. The pToF pixel array according to claim 4, wherein the control circuit includes a plurality of control units, each of which includes:
   an address decoder configured to receive a pixel address;
   a latch configured to receive mode information about an operation mode of the pToF pixels;
   a first control logic unit configured to control the photo sensitive unit of the pToF pixel corresponding to the pixel address, according to the pixel address and the operation mode; and
   a second control logic unit configured to control the first conversion unit of the pToF pixel corresponding to the pixel address, according to the pixel address and the operation mode.

7. The pToF pixel array according to claim 6, wherein an input end of the latch is connected to the address decoder, and an output end of the latch is connected the first control logic unit and the second control logic unit respectively; output ends of the first control logic unit are connected to the control end of the enable switch and the third input end of the comparator in the photo sensitive unit respectively; and output ends of the second control logic unit are connected to the first input end of the logic circuit, the first end of the first MOS, the first end of the second MOS and the control end of the selective switch respectively.

8. The pToF pixel array according to claim 6, wherein each of the control units further includes a plurality of second buffers configured to be connected to the output ends of the first control logic unit and the second control logic unit.

9. The pToF pixel array according to claim 6, wherein each of the control units is configured to be connected to a row of the pToF pixels.

10. The pToF pixel array according to claim 7, wherein each of the control units is configured to:
    receive the pixel address and the mode information; and
    when the mode information indicates a first mode, control the operation mode of the pToF pixel corresponding to the pixel address to the first mode by the first control logic unit and the second control logic unit, and trigger the sending out of the light pulse signal simultaneously;
    when the pToF pixel operates in the first mode, the pToF pixel is configured to:
    control the sample switch to be turned on;
    obtain a first voltage signal corresponding to the first time signal at a second node, wherein the second node is a connection point of the sample switch, the capacitor and the first MOS;

when the photodiode receives the return signal of the light pulse signal in a preset time period, and a voltage of the photodiode at a first node is higher than the reference voltage of the comparator, control the sample switch to be turned off by the logic circuit, wherein the first node is a connection point of the photodiode, the first input end of the comparator and the enable switch; and maintain the first voltage signal at the second node.

11. The pToF pixel array according to claim 10, wherein each of the control units is configured to:
control the operation mode of the pToF pixel corresponding to the pixel address to a second mode by the second control logic unit, after the photo sensitive unit of the pToF pixel receives the return signal of the light pulse signal in the preset time period, and the voltage of the photodiode at the first node is higher than the reference voltage of the comparator;
when the pToF pixel operates in the second mode, the pToF pixel is configured to:
control the selective switch and the second MOS to be turned on;
obtain a second voltage signal at a third node, and transmit the second voltage signal to the conversion circuit corresponding to the pToF pixel, wherein the third node is a connection point of the first MOS, the second MOS and the first buffer;
control the first MOS to be turned on; and
obtain a third voltage signal at the third node, and transmit the third voltage signal to the conversion circuit corresponding to the pToF pixel.

12. The pToF pixel array according to claim 11, wherein the conversion circuit is configured to calculate the time-of-flight corresponding to the pToF pixel according to the received second voltage signal and the third voltage signal.

13. The pToF pixel array according to claim 1, wherein the pToF pixel array includes a plurality of the conversion circuits, each of which is connected to a column of the pToF pixels.

14. The pToF pixel array according to claim 1, wherein the control circuit is configured to:
receive a pixel address and mode information; and
when the mode information indicates a first mode, control the operation mode of the pToF pixel corresponding to the pixel address to a first mode, and trigger the sending out of the light pulse signal simultaneously;
when the pToF pixel operates in the first mode, the pToF pixel is configured to:
obtain a first voltage signal when the light pulse signal is sent out; and
when receiving the return signal of the light pulse signal in a preset time period and a signal value of the return signal is higher than a preset threshold value, store the first voltage signal.

15. The pToF pixel array according to claim 14, wherein the control circuit is configured to:
control the operation mode of the pToF pixel corresponding to the pixel address to a second mode, after the pToF pixel receives the return signal of the light pulse signal in the preset time period and the signal value of the return signal is higher than the preset threshold value;
when the pToF pixel operates in the second mode, the pToF pixel is configured to:
obtain a second voltage signal and a third voltage signal related to the first voltage signal respectively; and
transmit the second voltage signal and the third voltage signal to the conversion circuit corresponding to the pToF pixel.

16. The pToF pixel array according to claim 15, wherein the conversion circuit is configured to calculate the time-of-flight corresponding to the pToF pixel according to the received second voltage signal and the third voltage signal.

17. The pToF pixel array according to claim 11, wherein the control circuit is configured to scan the pToF pixels distributed in the array line-by-line, one-by-one or globally, to calculate the time-of-flight corresponding to each of the pToF pixels.

18. A pToF sensor, comprising a pToF pixel array, wherein the pToF pixel array includes:
a plurality of pToF pixels distributed in an array;
each of the pToF pixels comprising:
a photo sensitive unit configured to detect a return signal of a light pulse signal, and
a first conversion unit provided inside of each of the pToF pixels and configured to convert a time signal corresponding to each of the pToF pixels to an analog signal;
a control circuit provided outside of the pToF pixels, connected to each of the pToF pixels, and configured to control an operation mode of each of the pToF pixels; and
a conversion circuit provided outside of the pToF pixels, connected to each of the pToF pixels, and configured to calculate a time-of-fight corresponding to each of the pToF pixels according to the analog signal corresponding to each of the pToF pixels, wherein the time-of-flight is a time from sending out the light pulse signal to receiving the return signal of the light pulse signal by each of the pToF pixels.

19. An operation method for a pToF pixel array, the pToF pixel array comprising a plurality of pToF pixels distributed in an array, and the operation method comprising:
receiving a pixel address and mode information;
when the mode information indicates a first mode, triggering sending out of a light pulse signal, and obtaining a first voltage signal when sending out the light pulse signal simultaneously;
storing the first voltage signal when the pToF pixel corresponding to the pixel address receives a return signal of the light pulse signal in a preset time period and a signal value of the return signal is higher than a preset threshold value;
obtaining a second voltage signal and a third voltage signal related to the first voltage signal after the pToF pixel corresponding to the pixel address receives the return signal of the light pulse signal in the preset time period and the signal value of the return signal is higher than the preset threshold value; and
calculating a time-of-flight corresponding to the pToF pixel corresponding to the pixel address, wherein the time-of-flight is a time from sending out the light pulse signal to receiving the return signal of the light pulse signal by the pToF pixel.

20. The operation method for a pToF pixel array according to claim 19, comprising: scanning the pToF pixels distributed in the array line-by-line, one-by-one or globally, to calculate the time-of-flight corresponding to each of the pToF pixels.

* * * * *